United States Patent
Picciotto et al.

(10) Patent No.: US 7,082,378 B2
(45) Date of Patent: Jul. 25, 2006

(54) DISPLACEMENT SENSING BY COMPARING MATRICES OF POINTWISE MEASUREMENTS

(75) Inventors: Carl E. Picciotto, Menlo Park, CA (US); Jun Gao, Saratoga, CA (US); Neal W. Meyer, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/994,055

(22) Filed: Nov. 18, 2004

(65) Prior Publication Data

US 2006/0106567 A1    May 18, 2006

(51) Int. Cl.
 G01B 7/00    (2006.01)
 G06F 15/00    (2006.01)
(52) U.S. Cl. ...................... 702/155; 702/150
(58) Field of Classification Search ............ 702/150, 702/153, 155, 158, 159, 176, 186, 189, 196; 73/433, 588; 356/158; 382/236, 285
 See application file for complete search history.

(56) References Cited

U.S. PATENT DOCUMENTS

| | | | |
|---|---|---|---|
| 4,244,026 A | 1/1981 | Dickey, Jr. | |
| 4,495,589 A | 1/1985 | Hirzel | |
| 5,030,984 A | 7/1991 | Buckler et al. | |
| 5,149,980 A | 9/1992 | Ertel et al. | |
| 5,717,792 A | 2/1998 | Poggio et al. | |
| 5,742,658 A * | 4/1998 | Tiffin et al. | 378/44 |
| 6,195,475 B1 | 2/2001 | Beausoleil et al. | |
| 6,760,488 B1 * | 7/2004 | Moura et al. | 382/285 |
| 2004/0165781 A1 * | 8/2004 | Sun | 382/236 |

OTHER PUBLICATIONS

Barron, J.L. et. al., "Performance of Optical Flow Techniques," International Journal of Computer Vision 12:1, 43-77 (1994).
Jahne, B., Digital Image Processing; Concepts, Algorithms and Scientific Applications, Springer-Verlag (1997) at pp. 395-399, 404-413, and 430-437.
Russ, J., The Image Processing Handbook, 2nd Edition, CRC Press (1995), pp. 57-59.
Vernon, D., Fourier Vision: Segmentation and Velocity Measurement Using the Fourier Transform, Kluwer Academic Publishers (2001), pp. 16-23.

* cited by examiner

Primary Examiner—Bryan Bui

(57) ABSTRACT

Determining a displacement of a substantially rigid item relative to a frame of reference between a first time and a second time is described. At the first time, a first set of pointwise measurements of a physical property of the item taken at a plurality of fixed locations relative to the frame of reference is acquired. At the second time, a second set of pointwise measurements of the physical property taken at the plurality of fixed locations is acquired. A first matrix derived from the first set of pointwise measurements is compared to a second matrix derived from the second set of pointwise measurements to determine the displacement.

27 Claims, 4 Drawing Sheets

DISPLACEMENT SENSING BY COMPARING MATRICES OF POINTWISE MEASUREMENTS

FIELD

This patent specification relates to sensing a displacement of a substantially rigid item relative to a frame of reference.

BACKGROUND

It is often desirable to sense the displacement of an item that has moved, or is repeatedly moving, relative to a frame of reference. By virtue of their relationship through a time variable, displacement sensing can often be achieved through velocity sensing, and vice versa. If the item in question is a known object, or at least a known blob, displacement sensing or velocity sensing can be achieved using a variety of methods, ranging from mathematically simpler interferometry or Doppler shift methods to highly complex image segmentation algorithms.

A more subtle scenario arises where the moving item offers little in the way of recognizable features, such as where a large sheet of markerless paper is moving past a magnifying glass, or where a featureless semiconductor substrate is moving past a microscope objective. So-called image flow methods, also referred to optical flow methods, have been used to determine displacements and/or velocities in such scenarios by processing sequential optical images of the surface of the moving item, such as those acquired by a CCD camera. Provided that the optically acquired images can reveal a sufficient amount of surface texture, image flow methods can be effective in computing the needed displacements and velocities. Indeed, some algorithms are capable of computing displacement to a level of precision greater than the pixel resolution of the CCD camera itself.

One issue arises when the moving item cannot or should not be optically imaged for the purposes of determining item displacement. By way of example, the required surface textures may be too small to be detected by optical imaging, or the application of visible light may damage the item's surface. There may be a variety of other reasons that optically imaging the item may be inapplicable, undesirable, inefficient, or impossible to achieve for purposes of displacement sensing.

SUMMARY

In accordance with an embodiment, determining a displacement of a substantially rigid item relative to a frame of reference between a first time and a second time is provided wherein, at the first time, a first set of pointwise measurements of a physical property of the item taken at a plurality of fixed locations relative to the frame of reference is acquired. At the second time, a second set of pointwise measurements of the physical property taken at the plurality of fixed locations is acquired. A first matrix derived from the first set of pointwise measurements is compared to a second matrix derived from the second set of pointwise measurements to determine the displacement.

Also provided is an apparatus for determining a change of position of a substantially rigid item over a time interval relative to a frame of reference, comprising a pointwise sensing device that senses, prior to the time interval, a physical property of the item at a first plurality of points that are fixed relative to the frame of reference. The pointwise sensing device then senses, subsequent to the time interval, that physical property at a second plurality of points that are also fixed relative to the frame of reference and that have known offsets relative to the first plurality of points. The apparatus further comprises a processing device that computes, based on a comparison of the sensed physical property at the first plurality of points and the second plurality of points, the change of position of the item over the time interval. Preferably, the comparison performed by the processor includes matrix processing steps according to an image shift sensing algorithm.

Also provided is an apparatus for determining a displacement of a substantially rigid item relative to a frame of reference between a first time and a second time, comprising a scanning electron microscope (SEM) that measures, at the first and second times, a local physical property of the item at a plurality of locations that are fixed relative to the frame of reference. The apparatus further includes a processing device that forms first and second matrices from the measurements taken at the first and second times, respectively, and then compares the first and second matrices to determine the displacement of the item.

DETAILED DESCRIPTION

Figure 1:
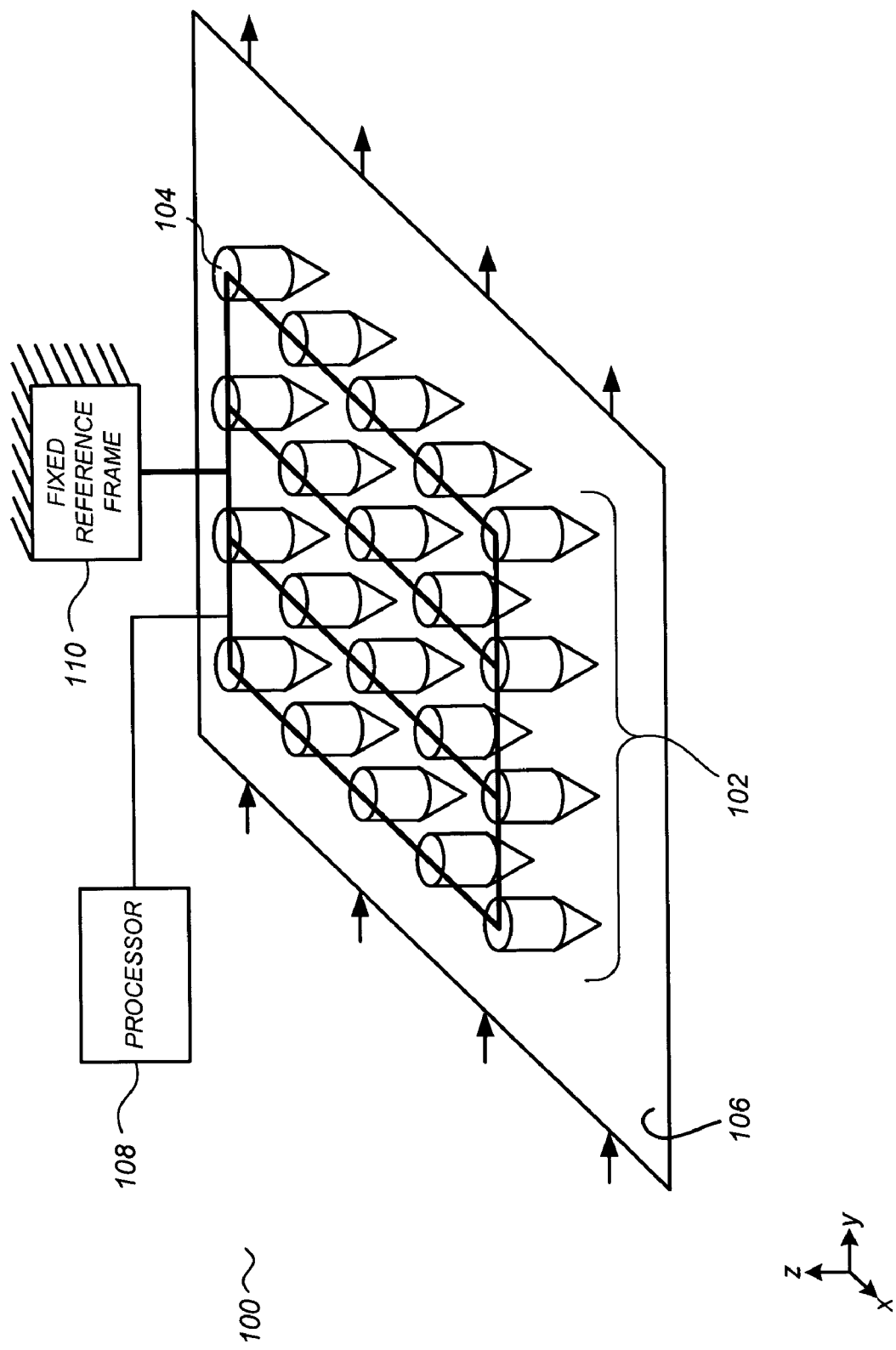
FIG. 1 illustrates an apparatus for displacement sensing according to an embodiment.

FIG. 1 illustrates an apparatus 100 for displacement sensing according to an embodiment. Apparatus 100 determines a displacement of an item 106 that, in the example of FIG. 1, is translated in a horizontal direction relative to a fixed reference frame 110. As used herein, fixed reference frame refers to the frame of reference against which the displacement is being measured. Notably, the fixed reference frame 110 may itself be in motion relative to a different frame of reference.

Apparatus 100 comprises a pointwise sensing device 102 comprising an array of point sensors 104 that are fixed relative to the fixed reference frame 110. The pointwise sensing device 102 is coupled to a processor 108 such that digitized readings from the point sensors 104 can be processed by the processor 108 in accordance with the functionalities described herein. As discussed further infra, each point sensor 104 can comprise any of a variety of measurement devices without departing from the scope of the present teachings. For example, each point sensor 104 may comprise a resistance probe, a temperature probe, a capacitance probe, or generally any kind of probe capable of pointwise sensing of a local physical characteristic of the item.

Pointwise sensing generally refers to the detection of a physical characteristic at a point, or small local area therearound, through direct interaction or direct contact with that point or small local area. Generally speaking, pointwise sensing is to be contrasted with optical imaging, in which visible light wavefronts arise from a surface as a whole, are concurrently and collectively passed through an aperture, and are formed into a real image on a sensing device such as a CCD sensor. For example, in one embodiment, the physical characteristic that is pointwise-sensed may be a hardness measure. In this case, the direct interaction at each point would comprise pressing a hardened point chisel at a known force and measuring a depth of penetration. In another embodiment, the physical characteristic may be a temperature, and the direct interaction at each point would comprise placing a thermocouple probe at that point, or a thermal sensor just above that point. In another embodiment, the physical characteristic may be an electrical capacitance, and the direct interaction at each point would comprise placing one lead, or both leads, of a capacitance-measuring circuit at that point.

Figure 2:
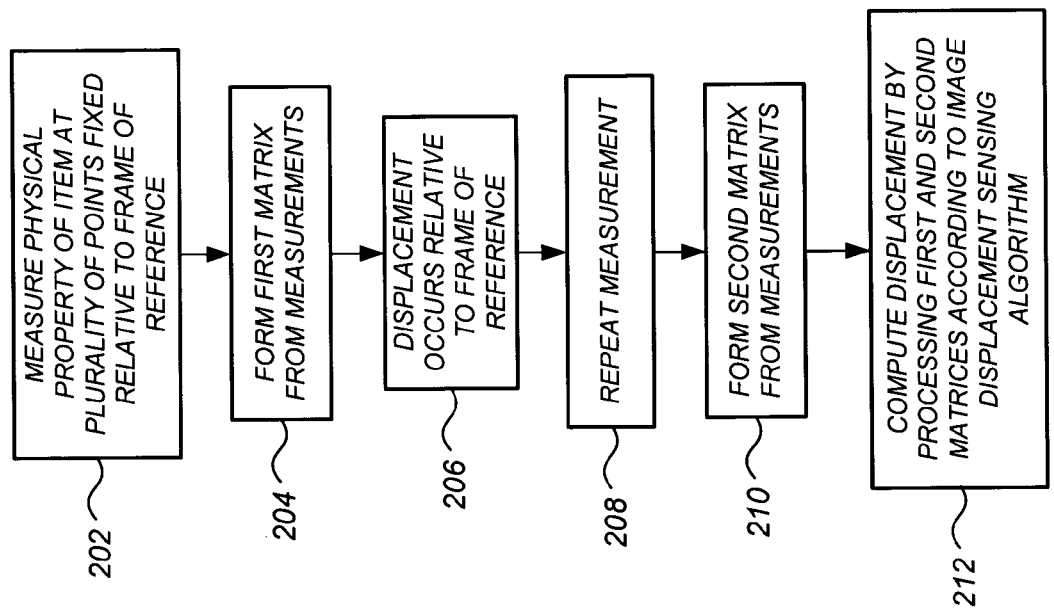
FIG. 2 illustrates displacement sensing according to an embodiment.

FIG. 2 illustrates displacement sensing according to an embodiment. At step 202, a physical property of the item is measured at a plurality of points fixed relative to a frame of reference, e.g., measured by the point sensors 104. At step 204, a first matrix is formed from these measurements at processor 108. At step 206 displacement of the item occurs relative to the frame of reference 110 over some time interval. It is to be appreciated, of course, that the amount of displacement might be zero if the item 106 is not moving relative to the frame of reference 110. At step 208, the pointwise measurement process is repeated, and at step 210 a second matrix is formed from these measurements at processor 108.

In one embodiment, the measurements taken at steps 202 and 208 are instantaneous across the sensed surface, i.e., all of the measurements are taken at the same instant in time by the point sensors 104. In another embodiment, the measurements can be taken in a serial manner by the point sensors 104 at steps 202 and 208. In general, at the time the measurements are taking place, the item 106 should either be stationary or, if it is in motion, should be moving relatively slowly in comparison to the rate of the pointwise measurement process. At step 212, the displacement of the item is computed by processing the first and second matrices according to an image displacement sensing algorithm.

Image displacement sensing algorithm refers to a class of processing algorithms in which a first matrix $M_t(x,y)$ and a second matrix $M_{t+\Delta t}(x,y)$ are processed to compute a displacement vector $\Delta M$ therebetween under a rigid body assumption, i.e. under an assumption that features or textures of the underlying item do not change over the interval $\Delta t$. In one embodiment, image displacement sensing algorithm refers to a subclass of image flow algorithms specially adapted for fast computation under the rigid body assumption. In another embodiment, image displacement sensing algorithm refers to a subclass of image flow algorithms specially adapted for detection of rigid-body displacements to sub-pixel resolutions. In still another embodiment, image displacement sensing algorithm refers to a subclass of image flow algorithms specially adapted to achieve both fast computation and sub-pixel resolution under the rigid body assumption.

In accordance with an embodiment, it has been found that one particularly useful image displacement algorithm cross-correlates the first and second matrices to produce a cross-correlation function, and then locates a global extremum of the cross-correlation function. Preferably, the cross-correlating further comprises estimating a continuous correlation surface at sub-pixel locations within the pixelized grid. A comparison function is computed comprising, for a predetermined number N of relative offset locations (N=9, 25, for example), a sum of squared differences, or other comparison metric, between the elements of the first and second matrices. A cost function is minimized between the comparison function and an estimated continuous correlation surface, wherein the estimated continuous correlation surface is a fitting function whose parameters are varied to minimize the cost function. In one embodiment, the fitting function is a Taylor series, although the scope of the present teachings is not so limited. In one embodiment in which the number of offset locations N is 9, the fitting function has six parameters, although the scope of the present teachings is not so limited. A global extremum of the estimated continuous correlation surface is located to determine the displacement, whereby the displacement can be determined to a sub-pixel resolution. Discussions of comparable methods used for optically-acquired images can be found in U.S. Pat. No. 5,149,180 and U.S. Pat. No. 6,195,475. In accordance with another embodiment, it has been found that another particularly useful image displacement algorithm computes phase differences between frequency domain representations of the first and second matrices, and determines image displacement based on the computed phase differences.

Figure 3:
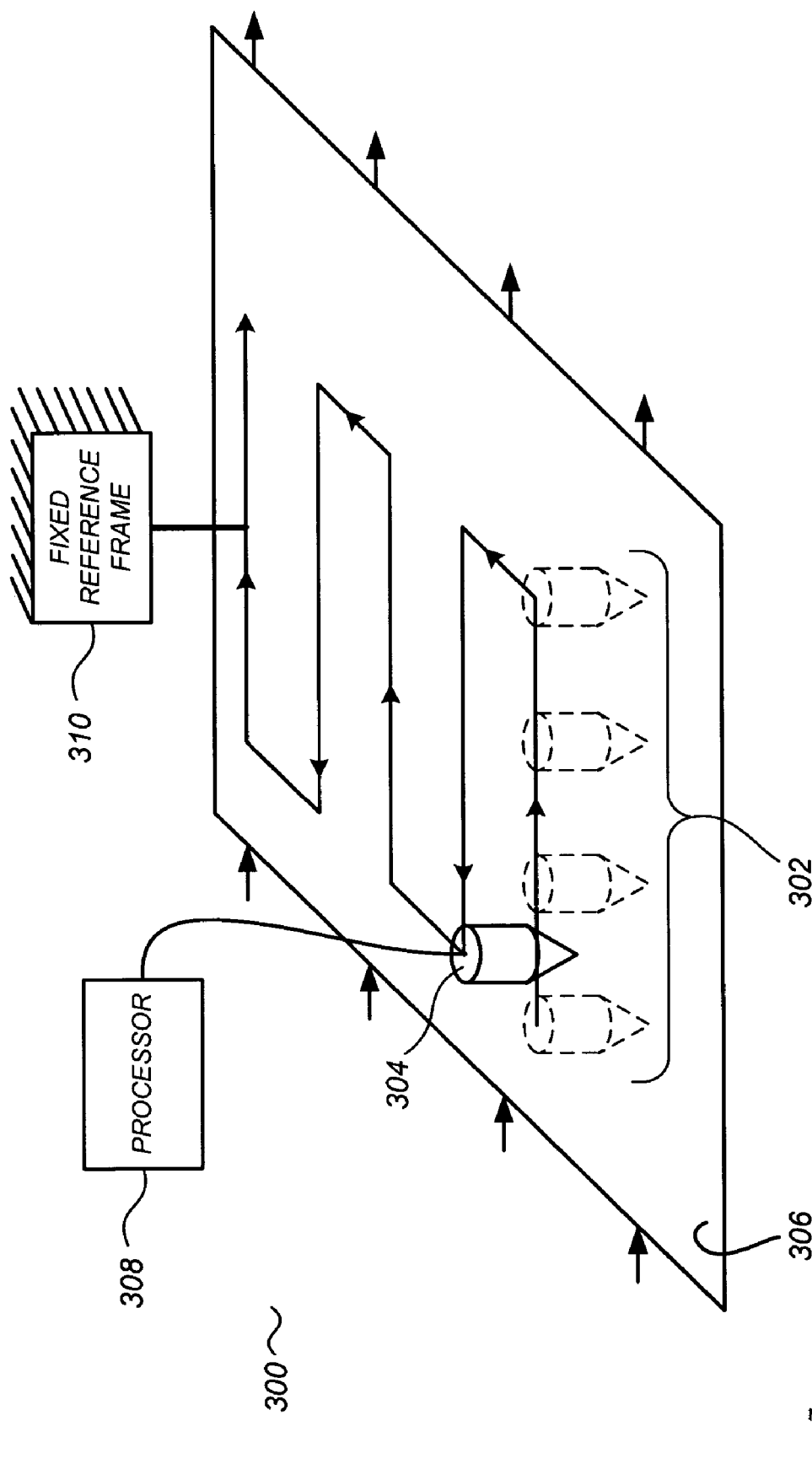
FIG. 3 illustrates an apparatus for determining a change of position according to an embodiment.

FIG. 3 illustrates an apparatus 300 for determining a change of position according to an embodiment. Apparatus 300 determines a displacement of an item 306 translated in a horizontal direction relative to a fixed reference frame 310. Apparatus 300 is similar to the apparatus 100 of FIG. 1 with the exception that the pointwise sensing apparatus comprises a single point sensor 304 that is mechanically translated to a plurality of fixed locations 302 relative to the frame of reference 310. The measurements are necessarily taken in a serial manner by the point sensor 304 and, accordingly, the item 306 should either be stationary at the time the measurements are taking place or, if it is in motion, should be moving by a rate that is relatively slow in comparison to the mechanically driven, pointwise measurement process. Image displacement sensing algorithms are performed by a processor 308 similar to those performed by processor 108 of FIG. 1, supra. In other embodiments, more than one point sensor 304 is provided, but their numbers are fewer than the number of locations to be sensed, and mechanical translation is used to achieve sensing at each desired location.

Examples of pointwise sensing devices that can be used in embodiments similar to those of FIG. 2 include scanning tunneling microscopes (STMs), atomic force microscopes (AFMs), NSOMs, and scanning capacitance microscopes. In each case and in analogous devices, a single probe tip is translated across the surface of the item and pointwise measurements are taken. The embodiment of FIG. 2 might be preferred over the embodiment of FIG. 1 in cases where it is too expensive or impractical to form a complete array of point sensors at the desired resolution. By way of non-limiting example, other physical properties that can be pointwise-sensed according to one or both of the embodiments of FIGS. 1 and 2 include electrical conductance, thermal conductivity, thermal capacitance, and electrical inductance.

Figure 4:
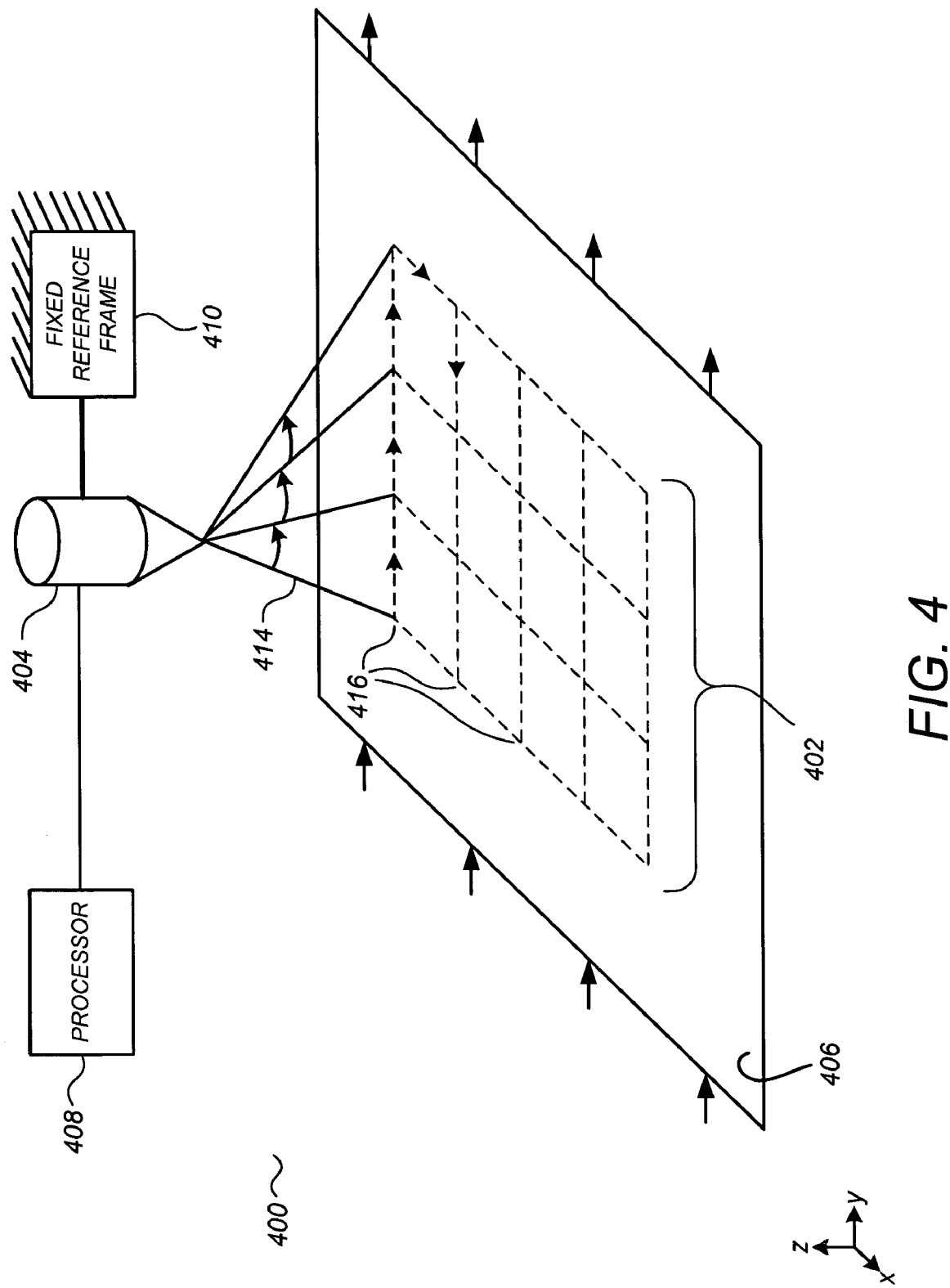
FIG. 4 illustrates an apparatus for displacement sensing according to an embodiment.

FIG. 4 illustrates an apparatus 400 for displacement sensing according to an embodiment. Apparatus 400 determines a displacement of an item 406 translated in a horizontal direction relative to a fixed reference frame 410. Apparatus 400 is similar to the apparatus 300 of FIG. 3 except that the direct, pointwise interaction is performed by a probing point beam 414 emitted from a pointwise sensor 404. As used herein, probing point beam generally refers to a non-optical beam intended to stimulate some type of measurable local response from a surface. Devices for measuring such local response (not shown) operate in close conjunction with devices driving the pointwise sensor 404. The probing point beam 414 is serially translated to a plurality of fixed locations 416 of a fixed array 402 relative to the frame of reference 410. As with the embodiment of FIG. 3, the measurements are also taken in a serial manner by the point sensor 404, although in many cases the serial translation and pointwise measurement process can be faster than with a mechanically-driven probe. Image shift sensing algorithms are performed by a processor 408 similar to those performed by processor 108 of FIG. 1 and processor 308 of FIG. 3, supra.

In one embodiment, the pointwise sensor 404 comprises a scanning electron microscope (SEM) that senses a pointwise secondary electron emission property of a surface. In a pointwise manner, the SEM focuses a beam of electrons 414 at a particular point on the surface, and secondary electrons emitted from the surface are detected by a surrounding detection system, resulting in a measurement reading for that point. According to an embodiment, the readings from a succession of points 416 are formed into a matrix, and successive matrices corresponding to different points in time are processed according to an image displacement sensing algorithm.

When combined with image displacement sensing algorithms, the use of an SEM has been found particularly advantageous for displacement sensing in a nanofabrication context, such as for assistance in advancing a substrate in a focused ion beam (FIB) mill by very small amounts with very tight tolerances. These tight tolerances can be as small as 2 nm corresponding, for example, to the size of a single atom, or less. Through precise displacement sensing and advancement, so-called "stitch mark" anomalies can be avoided. Advantageously, the processing associated with the image displacement sensing algorithms serves to reduce the impact of noise issues on any particular matrix formed from the SEM readings, and accurate displacement sensing can be achieved to resolutions even finer than the "pixel" size of the SEM matrix.

Thus, in accordance with an embodiment, several advantages brought about by image displacement sensing algorithms for optical images, such as providing sub-pixel resolution and the ability to work with relatively featureless moving surfaces, are advantageously brought about in the context of pointwise-sensed physical characteristics not amenable to optical imaging.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, in addition to the two-dimensional scenarios described supra, the present teachings are applicable in one-dimensional scenarios, three-dimensional scenarios, and generally in N-dimensional scenarios. By way of further example, although some embodiments described supra are presented in the context of a lateral translations, it is to be appreciated that displacements involving item rotation or combinations of rotation and translation are within the scope of the present teachings.

By way of still further example, although described supra in terms of an item that is either stationary or moving slowly during the pointwise measurement intervals, it is within the scope of the present teachings for the item to be moving relatively quickly during these times, provided that the motion is constant or at least partially predictable. In these situations, although the acquired matrices may each be partially distorted relative to the actual textures or features on the item surface, displacements between the matrices can still be reliably computed as long as the matrices are distorted in the same way.

By way of still further example, it is to be appreciated that the scope of the present teachings is not limited to pointwise sensing locations that are arranged on a regular fixed grid, such as a square or rectangular grid. It is within the scope of the present teachings to use circular grids, spiral grids, or grids of other shapes, as well as irregular or nonperiodic grids, and then perform a spatial mapping onto square or rectangular matrices prior to processing. Thus, reference to the details of the described embodiments are not intended to limit their scope.

What is claimed is:

1. A method for determining a displacement of a substantially rigid item relative to a frame of reference between a first time and a second time, comprising:
    at the first time, acquiring a first set of pointwise measurements of a non-optical physical property of the item taken at a plurality of locations fixed relative to the frame of reference;
    at the second time, acquiring a second set of pointwise measurements of said physical property of the item taken at said plurality of locations; and
    comparing a first matrix derived from said first set of pointwise measurements to a second matrix derived from said second set of pointwise measurements to determine said displacement.

2. The method of claim 1, wherein said comparing comprises:
    cross-correlating said first and second matrices to produce a cross-correlation function; and
    locating a global extremum of said cross-correlation function.

3. The method of claim 2, said plurality of locations forming a pixelized grid, each element of said first and second matrices corresponding to a pixel location on said pixelized grid, wherein said cross-correlating comprises estimating a continuous correlation surface at sub-pixel locations within said pixelized grid, said estimating comprising:
    computing a comparison function having, for each of a predetermined number of relative offset locations between the first and second matrices, a comparison metric therebetween; and
    minimizing a cost function between the comparison function and an estimated continuous correlation surface, wherein the estimated continuous correlation surface includes a finite-element fitting function.

4. The method of claim 3, wherein said comparison metric comprises a pixelwise sum of squared differences between said first and second matrices at each offset, and wherein said predetermined number of relative offsets is a relatively small percentage of a total number of elements in said first and second matrices.

5. The method of claim 1, wherein said comparing comprises determining a phase difference between frequency domain representations of said first and second matrices.

6. The method of claim 1, wherein said substantially rigid item comprises a substrate, and wherein said measurements are taken by a scanning electron microscope (SEM).

7. The method of claim 1, wherein said physical property comprises one or more of a thermal property, and electrical property, and a structural characteristic.

8. The method of claim 1, wherein said pointwise measurements are taken by at least one of a scanning tunneling microscope (STM), an atomic force microscope (AFM), an NSOM, and a scanning capacitance microscope.

9. An apparatus for determining a change of position of a substantially rigid item over a time interval relative to a frame of reference, comprising:
   a pointwise sensing device sensing, prior to the time interval, a physical property of the item at a first plurality of points fixed relative to the frame of reference and sensing, subsequent to the time interval, said physical property at a second plurality of points fixed relative to the frame of reference and having known offsets relative to said first plurality of points; and
   a processing device computing, based on a comparison of said sensed physical property at said first plurality of points and said second plurality of points, said change of position of said item over the time interval;
   wherein said comparison comprises matrix processing according to an image shift sensing algorithm.

10. The apparatus of claim 9, said first plurality of points being the same as said second plurality of points, said pointwise sensing device comprising an array of individual point sensors in contact with said item, said individual point sensors simultaneously sensing said physical property at said plurality of points prior to said time interval, and said individual point sensors simultaneously sensing said physical property at said plurality of points subsequent to said time interval.

11. The apparatus of claim 9, said first plurality of points being the same as said second plurality of points, said pointwise sensing device comprising a single point sensor moved throughout said plurality of points to sense said physical property prior to said time interval and moved throughout said plurality of points to sense said physical property subsequent to said time interval.

12. The apparatus of claim 11, wherein said pointwise sensing device comprises one of a scanning tunneling microscope (STM), an atomic force microscope (AFM), an NSOM, and a scanning capacitance microscope.

13. The apparatus of claim 9, said pointwise sensing device comprising a single particle beam swept through said first and second plurality of points at said prior and subsequent times, respectively, said pointwise sensing device sensing a response to said particle beam at each of said first and second plurality of points.

14. The apparatus of claim 13, wherein said item comprises at least one of a semiconductor substrate, a mask, and an imprint lithography mold, and wherein said pointwise sensing device comprises a scanning electron microscope (SEM).

15. The apparatus of claim 14, said processor forming first and second matrices comprising said sensed physical property at said first and second plurality of points, respectively, wherein said image shift sensing algorithm comprises:
   cross-correlation of said first and second matrices to produce a cross-correlation function; and
   location of a global extremum of said cross-correlation function.

16. The apparatus of claim 15, said first plurality of points being the same as said second plurality of points and forming a pixelized grid, said processor forming first and second matrices comprising said sensed physical property at each pixel location on said pixelized grid, wherein said cross-correlating comprises estimating a continuous correlation surface at sub-pixel locations within said pixelized grid, and wherein said estimating comprises:
   computing a comparison function having, for each of a predetermined number of relative offset locations between the first and second matrices, a comparison metric therebetween; and
   minimizing a cost function between the comparison function and an estimated continuous correlation surface, wherein the estimated continuous correlation surface includes a finite-element fitting function.

17. The apparatus of claim 14, wherein said image shift sensing algorithm comprises determination of a phase difference between frequency domain representations of said first and second matrices.

18. An apparatus for determining a displacement of a substantially rigid item relative to a frame of reference between a first time and a second time, comprising:
   a scanning electron microscope (SEM) measuring, at said first and second times, a local physical property of the item at a plurality of locations fixed relative to said frame of reference; and
   a processing device forming first and second matrices from said measurements taken at said first and second times, respectively, and comparing said first and second matrices to determine said displacement of the item between said first and second times;
   wherein said comparing comprises at least one of cross-correlating said first and second matrices to produce a cross-correlation function and locating a global extremum of said cross-correlation function, and determining a phase difference between frequency domain representations of said first and second matrices.

19. The apparatus of claim 18, said plurality of locations forming a pixelized grid, each element of said first and second matrices corresponding to a pixel location on said pixelized grid, wherein said cross-correlating comprises estimating a continuous correlation surface at sub-pixel locations within said pixelized grid, and wherein said estimating comprises:
   computing a comparison function having, for each of a predetermined number of relative offset locations between the first and second matrices, a comparison metric therebetween; and
   minimizing a cost function between the comparison function and an estimated continuous correlation surface, wherein the estimated continuous correlation surface includes a finite-element fitting function.

20. The apparatus of claim 19, wherein said comparison metric comprises a pixelwise sum of squared differences between said first and second matrices at each offset, and wherein said predetermined number of relative offsets is a relatively small percentage of a total number of elements in said first and second matrices.

21. An apparatus for determining a displacement of a substantially rigid item over a time interval relative to a frame of reference, comprising:
   means for acquiring a matrix derived from pointwise measurements of a non-optical physical property of the item taken at a plurality of locations fixed relative to the frame of reference; and
   means for comparing a first matrix acquired by said means for acquiring prior to said time interval to a second matrix acquired by said means for acquiring subsequent to said time interval to determine said displacement.

22. A computer readable medium storing computer code for determining a displacement of a substantially rigid item relative to a frame of reference between a first time and a second time, comprising:

computer code for receiving a first set of pointwise measurements of a physical property of the item taken at a first time at a plurality of locations fixed relative to the frame of reference;

computer code for receiving a second set of pointwise measurements of said physical property of the item taken at a second time at said plurality of locations; and computer code for comparing a first matrix derived from said first set of pointwise measurements to a second matrix derived from said second set of pointwise measurements to determine said displacement.

23. The computer readable medium of claim 22, wherein said computer code for comparing comprises:

computer code for cross-correlating said first and second matrices to produce a cross-correlation function; and computer code for locating a global extremum of said cross-correlation function.

24. The computer readable medium of claim 23, said plurality of locations forming a pixelized grid, each element of said first and second matrices corresponding to a pixel location on said pixelized grid, wherein said computer code for cross-correlating comprises computer code for estimating a continuous correlation surface at sub-pixel locations within said pixelized grid, said computer code for estimating comprising:

computer code for generating a comparison function having, for each of a predetermined number of relative offset locations between the first and second matrices, a comparison metric therebetween; and computer code for minimizing a cost function between the comparison function and an estimated continuous correlation surface, wherein the estimated continuous correlation surface includes a finite-element fitting function.

25. The computer readable medium of claim 24, wherein said comparison metric comprises a pixelwise sum of squared differences between said first and second matrices at each offset, and wherein said predetermined number of relative offsets is a relatively small percentage of a total number of elements in said first and second matrices.

26. The computer readable medium of claim 22, wherein said computer code for comparing comprises computer code for determining a phase difference between frequency domain representations of said first and second matrices.

27. The computer readable medium of claim 22, wherein said substantially rigid item comprises a substrate, and wherein said measurements are taken by a scanning electron microscope (SEM).

* * * * *